May 22, 1934.  S. H. WILLISTON ET AL  1,960,038
WELL SURVEYING DEVICE
Filed Oct. 18, 1929  3 Sheets-Sheet 1

WITNESS:

INVENTORS
Samuel H. Williston
Charles R. Nichols
BY
ATTORNEYS.

May 22, 1934.  S. H. WILLISTON ET AL  1,960,038
WELL SURVEYING DEVICE
Filed Oct. 18, 1929   3 Sheets-Sheet 2

INVENTORS
Samuel H. Williston &
Charles R. Nichols
BY
ATTORNEYS

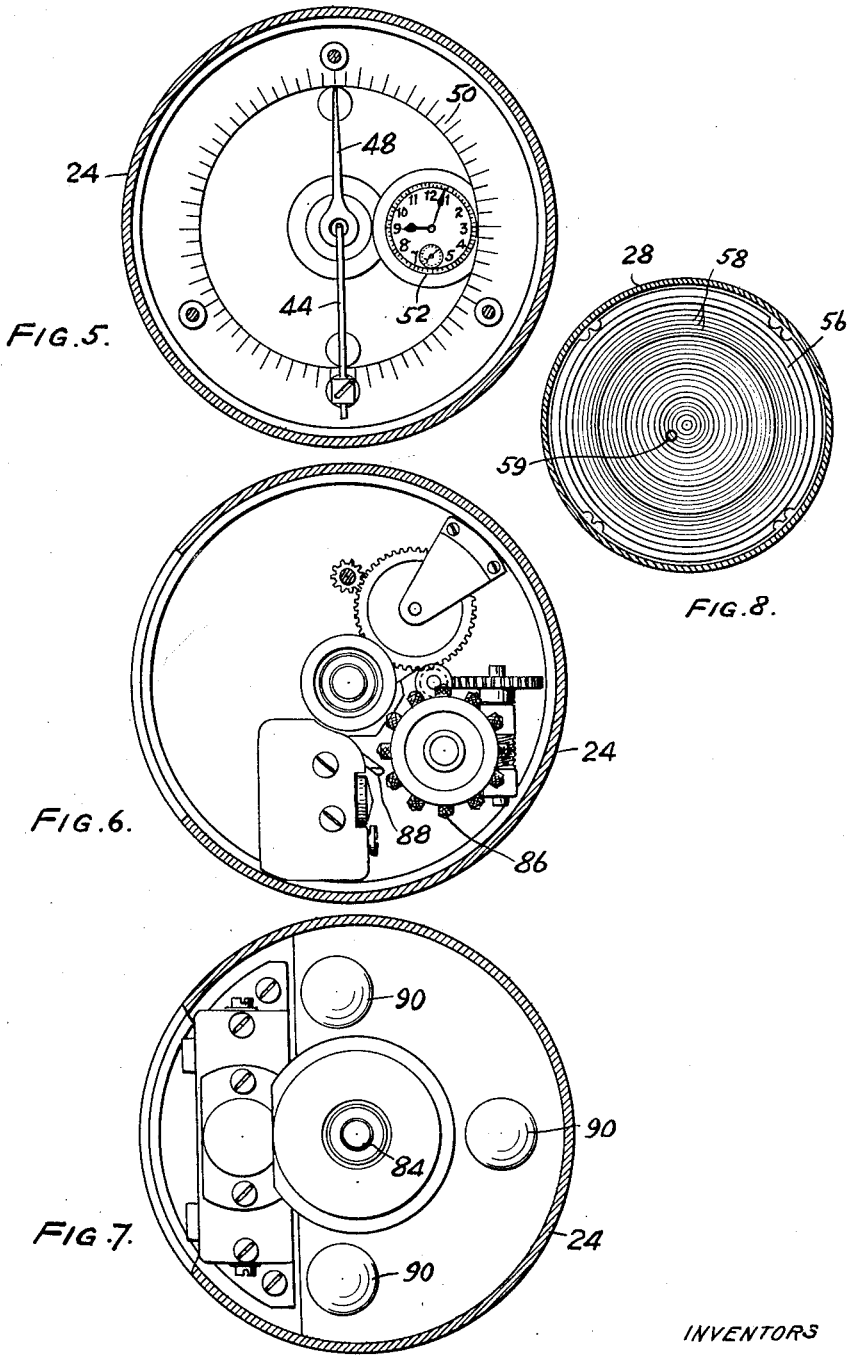

Patented May 22, 1934

1,960,038

UNITED STATES PATENT OFFICE 1,960,038

WELL SURVEYING DEVICE

Samuel H. Williston and Charles R. Nichols, Dallas, Tex., assignors, by mesne assignments, to Sperry-Sun Well Surveying Company, Philadelphia, Pa., a corporation of Delaware Application October 18, 1929, Serial No. 400,479

7 Claims. (Cl. 234—5.3)

This invention relates to a well surveying device of the type adapted to be lowered into a bore hole and arranged to give a suitable record of the orientation of the hole at a given point.

In drilling oil wells or the like, it may happen, due to variations in the strata through which the drill passes, or to other causes, that the bore hole will deviate to a considerable extent from the vertical and assume very decided angles relative to the vertical direction. As a result of this deviation, serious errors may enter into the geological interpretations and recommendations concerning sub-surface structure, water shut-offs, valuations of property, etc. In view of the resultant desirability of determining the location of any or all parts of a bore hole, various devices have heretofore been devised for determining with more or less accuracy the path of the bore hole through the soil.

The device of the present invention constitutes means for obtaining a substantially continuous record of the deviation of a bore hole throughout its length and includes means for automatically photographing simultaneously the position of a gyroscope, the position of a bubble or other level, and a time-piece from which the deviation of a hole may be readily determined at various points along its length.

The objects of the invention include the provision of means for obtaining great accuracy of results in a minimum of time and with a minimum of effort directed toward setting the device. Objects relating to the details of construction whereby these results are accomplished will be apparent from the following description read in conjunction with the accompanying drawings in which.

Figures 3, 4:
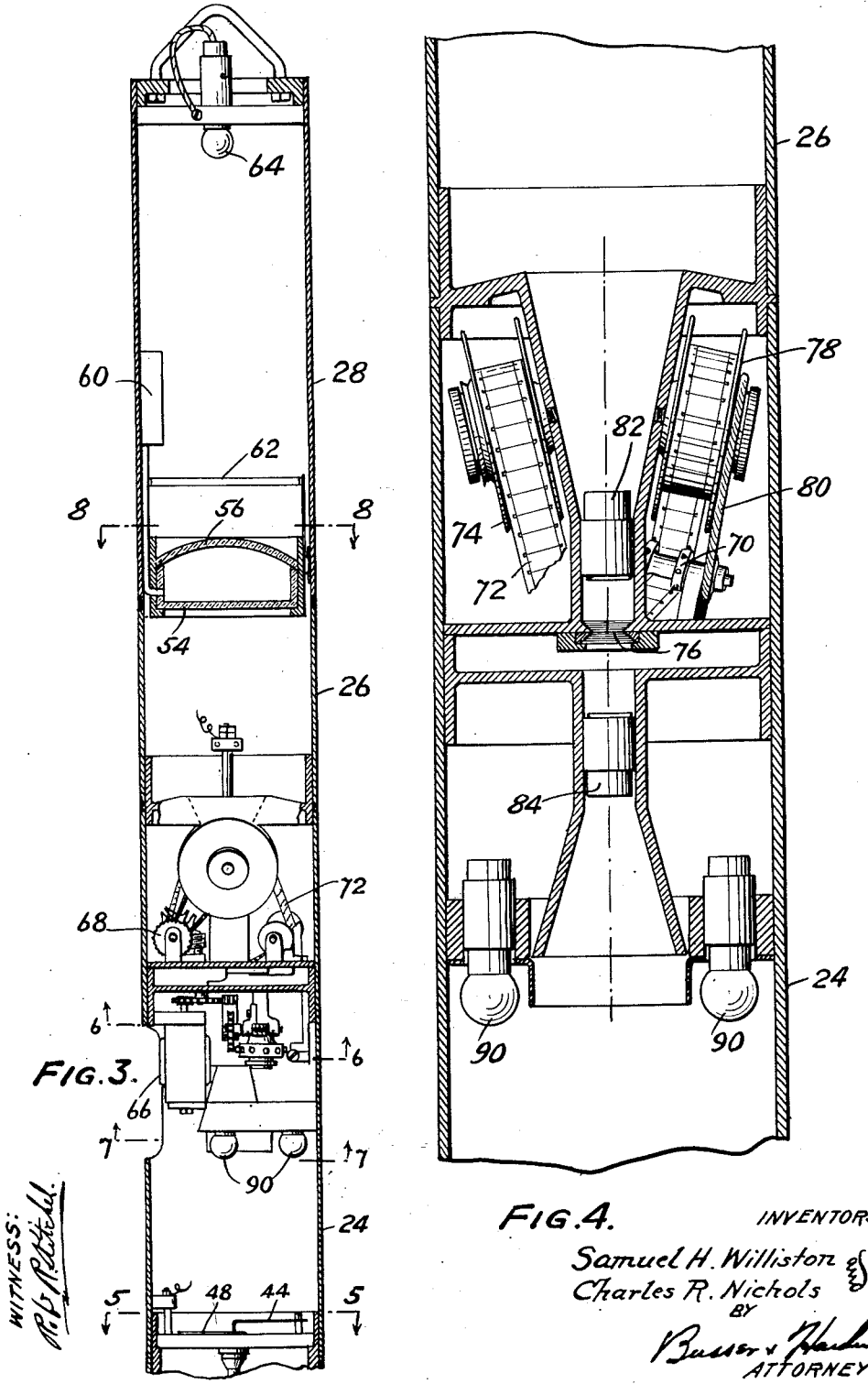
Fig. 3 is a longitudinal section through the upper portion of the instrument case.
Fig. 4 is a longitudinal section taken at right angles to Fig. 3 showing details of the camera mechanism.

Fig. 5 is a section on line 5—5 of Fig. 3;
Fig. 6 is a section on line 6—6 of Fig. 3;
Fig. 7 is a section on line 7—7 of Fig. 3; and
Fig. 8 is a section on line 8—8 of Fig. 3.

The instrument comprises an outer casing of heavy construction to withstand the high pressures existing at considerable depths in bore holes and includes two main portions 2 and 4 removably secured together for the adjustment and replacement of the recording instruments, which are enclosed in a casing 6. The upper end of portion 2 of the outer casing is provided with a head 8 which supports, through the medium of ball bearings, a swivel 10 arranged to be secured to a cable 12 by means of which the device may be lowered into the bore hole. To the lower end of portion 4 of the casing is secured a closure member 14 through which slides a rod 16 carrying a tapered nose 18 pressed outwardly by means of a spring 20 enclosed in a sleeve carried by the nose. By reason of the provision of this resiliently held nose, the device is enabled to slide readily over obstructions encountered during the passage through the bore hole, the impact being cushioned by means of the spring so as to effectively prevent disarrangement of the recording instruments. The upper end of portion 2 of the casing and the lower end of portion 4 are provided with suitable plugs welded therein to prevent the entrance of mud into the casing whereby damage to the instruments might occur.

Figures 1, 2:
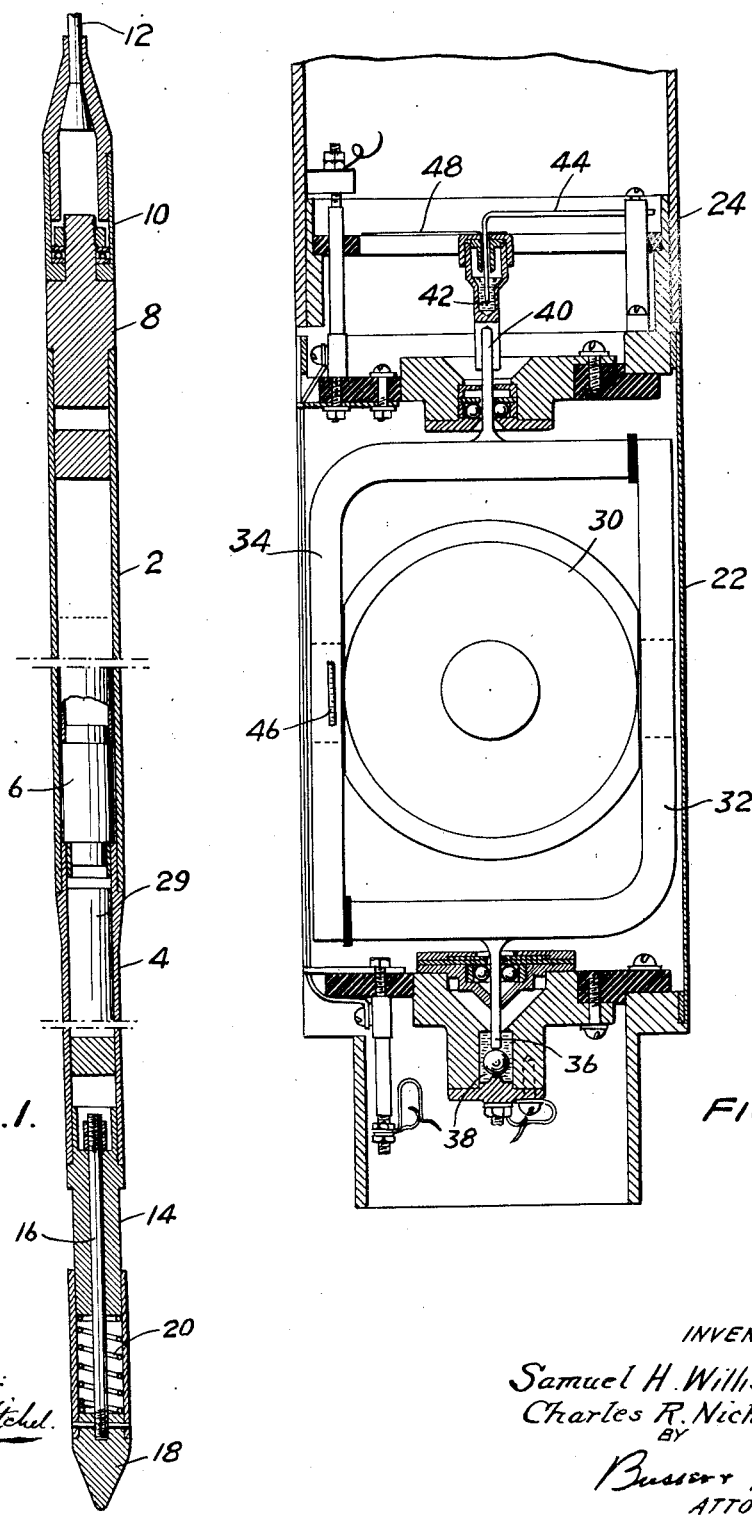
Fig. 1 is a longitudinal section through the casing arranged to enclose the recording instruments.
Fig. 2 is an enlarged axial section showing the details of the gyroscope mounting.

The inner casing carrying recording instruments comprises several portions 22, 24, 26 and 28 of thin metal adapted to be secured together in any suitable fashion and having their joints arranged so that ready access may be had to the elements of the recording mechanism. The lower end of this casing is arranged to be supported upon the upper end of portion 4 of the outer casing, as illustrated in Fig. 1. The interior of portion 4 is adapted to carry suitable batteries 29 to supply power for the operation of the recording instruments.

In the lower end of the instrument casing there is contained a gyroscope, the mounting of which is illustrated in Fig. 2. This gyroscope comprises a series wound motor preferably provided with a rotor having a large moment of inertia and adapted to operate at a very high speed so as to obtain the maximum gyroscopic effect in the confined space which is available. In one preferred embodiment of the invention, a series motor is provided operating at twenty-four volts and having a speed of 14,000 R. P. M. The gyroscope casing is pivoted in anti-friction bearings about an axis transverse to the axis of rotation of the rotor in a gimbal ring formed of two L-shaped members 32 and 34 insulated from each other as shown. The member 32 at its lower end is provided with a spindle 36 resting upon and guided by suitable ball bearings and extending into a cup 38 provided with mercury. The mercury within this cup 38 is electrically connected with a suitable clip for the reception of a wire extending from the battery. The second member 34 is provided with an upwardly extending spindle 40 suitably supported by means of anti-friction bearings and carrying a cup 42 into which extends a wire 44 grounded to the casing to which the other pole of the battery is also grounded. Electrical connections to the motor are made by means of hair-springs connected to the members 32 and 34 of the gimbal, adjustment to effect proper balance being made through the medium of a knurled disc 46 carried by the member 34 and secured to one end of one of the springs, whereby its tension may be readily adjusted. The use of the hair-springs for conducting current to the motor prevents pitting of the bearings, which might occur if they alone were made to conduct the current. The details of the gyroscope form no part of the present invention and consequently the construction is not described in detail, as various different arrangements may be made while securing the accomplishment of the objects of the invention.

The cup 42 carried by the upper spindle of the gimbal ring carries a pointer 48 the end of which rotates adjacent the concentric dial 50 secured within the casing. Adjacent the dial there is positioned a watch or other time-piece 52, as shown in Fig. 5, which is arranged to be photographed simultaneously with the dial and pointer.

In the upper portion of the instrument casing there is removably located a box level 54 having at least its top and bottom formed of glass, the top having a spherical surface, as indicated at 56. This type of box level, as shown most clearly in Fig. 8, is provided with a number of concentric circles whereby the position of the bubble 59 may be readily located in a photograph. A suitable mixture for use in the box level is found to consist of approximately 75% ethylene glycol and 25% water, inasmuch as this mixture prevents drying of the glass surface of the top 56 within the confines of the bubble and hence the bubble will always maintain its circular outline in contact with the cover. An expansion chamber 60 communicating with the liquid within the level permits expansion of the liquid without seriously affecting the size of the bubble. An opal glass plate 62 located between the box level and a lamp 64 serves to diffuse the illumination from the lamp to provide a background for the bubble, rendering the position thereof and the lines on the top 56 most readily discernible in a photograph.

Inasmuch as variations of construction of the bore hole of different amounts frequently occur and as it is desirable to determine with great accuracy the slight variations from the vertical, it is advisable to provide several box levels having various ranges. For example, three box levels having ranges of 5°, 20°, and 40° may be advantageously employed, the one having the smaller range insuring great accuracy of the determinations within that range.

Intermediate the gyroscope and the box level there is located the camera mechanism, which is driven by means of a suitable motor 66. This motor, which is operated from the battery, is connected through suitable gearing to an intermittent mechanism of the Geneva type indicated at 68, through which a feed sprocket 70 is caused to intermittently rotate and carry a film 72 from a reel 74 across an aperture 76 of the camera. After passage across the aperture and about the sprocket 70 the film is wound upon a reel 78 driven through an elastic belt 80 trained about a pulley on the sprocket shaft. Suitable lenses 82 and 84 produce images of the bubble and gyroscope pointer and time-piece respectively upon the film.

By arranging the spherical surface of the box level about the optical center of the lens arrangement 82 as center, a sharp image of the bubble and indicating lines upon the cover of the level is obtained. It is found that, although the radius of curvature of the cover varies with different box levels, the images of the various levels are approximately equally sharp even though the focus of the lens system 82 is unchanged.

To eliminate the necessity of supplying a shutter in connection with the camera, a flashing arrangement is provided comprising a wheel 86 having projections thereon adapted to contact and periodically close a switch 88 which is connected with lamps 64 and 90 to intermittently illuminate the gyroscope and level. This wheel 86 is driven from motor 66 through suitable gearing and may be adjusted, for example, so as to produce a momentary flash of the lamps every three seconds. The gearing between the film drive and this switch mechanism is so arranged that the film is stationary and properly aligned with the aperture 76 at the time the lamps are illuminated for the production of an exposure. After the lamps are again extinguished, the film will be given an intermittent movement so as to bring a successive portion into alignment with the aperture. The film may be provided with sensitive emulsion on either one or both sides so that overlapping images of the level and gyroscope pointer and time-piece are produced.

Since the motor and switch assembly is preferably formed separate from the camera, a suitable spring clutch is provided to permit proper connection between the motor and the film drive.

The electrical connections need not be described in detail. It may be pointed out, however, that desirably the connections are made throughout the various portions of the casings by providing plugs and sockets serving to automatically complete the circuits when the sections are assembled. A master switch may be provided to prevent the parts being set into operation prior to the assembly of the recording instruments within the outer casing.

The operation of the device in determining orientation of a bore hole will be readily understood. The gyroscope is so balanced by the counter-weights that the axis of rotation will maintain its original set position with respect to the earth. The pointer will, of course, remain fixed with respect to this direction. Accordingly, even though the casing and the parts which it carries rotates during the descent into the bore hole, the position of the bubble with respect to the earth will be accurately defined due to the simultaneous photographing of the dial and bubble. The presence of the time piece in the same photograph enables a check upon the depth at which any exposure has been made, since it is only necessary for an observer at the surface, as the cable is being paid out, to observe at what times predetermined lengths have descended into the bore hole. By charting the corresponding lengths and times, the depths at which the exposures are made may be readily ascertained from the readings of the time-piece.

What we claim and desire to protect by Letters Patent is:

1. A well surveying device comprising a casing adapted to enter a bore-hole, recording mechanism within said casing, said mechanism including direction and inclination instruments, a camera having an opening, automatic means within the casing for feeding a film intermittently across the opening, means for simultaneously projecting images of the direction and inclination indicating instruments upon the film, and means within the casing for automatically and intermittently illuminating the instruments for the production of successive exposures.

2. A well surveying device comprising a casing adapted to enter a bore-hole, and recording mechanism within said casing, said mechanism including direction and inclination indicating instruments, means for simultaneously projecting images of the direction and inclination indicating instruments upon a photographic film, automatic means within the casing for feeding the film across the field of projection, and means within the casing for automatically and intermittently producing successive exposures.

3. A well surveying device comprising a casing adapted to enter a bore-hole, and recording mechanism within said casing, said mechanism including direction and inclination indicating instruments, means for simultaneously projecting images of the direction and inclination indicating instruments upon a photographic film, automatic means within the casing for intermittently feeding the film across the field of projection, and means within the casing for automatically and intermittently producing successive exposures.

4. A well surveying device comprising a casing adapted to enter a bore-hole, and recording mechanism within said casing, said mechanism including direction and inclination indicating instruments, means for simultaneously projecting images of the direction and inclination indicating instruments upon a photographic film from opposite sides thereof, automatic means within the casing for feeding the film across the field of projection, and means within the casing for automatically and intermittently producing successive exposures.

5. A well surveying device comprising a casing adapted to enter a bore-hole, recording mechanism within said casing, said mechanism including a direction indicating instrument, an inclination indicating instrument, and means for simultaneously projecting images of the direction and inclination indicating instruments upon a photographic film located between them.

6. A well surveying device comprising a casing adapted to enter a bore hole, recording mechanism within said casing, said mechanism including a direction indicating instrument, an inclination indicating instrument located above the direction indicating instrument, means for simultaneously projecting images of the direction and inclination indicating instruments upon a photographic film located between them, automatic means within the casing for feeding the film across the field of projection, and means within the casing for automatically and intermittently producing successive exposures.

7. A well surveying device comprising a casing adapted to enter a bore-hole, recording mechanism within the casing, said mechanism including a direction indicating instrument, a box level having a spherical cover and a transparent bottom, the box level being located above the direction indicating instrument, and means for simultaneously projecting images of the direction indicating instrument and the box level upon a photographic film located between them.

SAMUEL H. WILLISTON.
CHARLES R. NICHOLS.